United States Patent
Wang et al.

(10) Patent No.: US 10,160,508 B2
(45) Date of Patent: Dec. 25, 2018

(54) SINGLE-WHEELED BALANCE VEHICLE (71) Applicant: NINEBOT (TIANJIN) TECH CO., LTD., Tianjin (CN)

(72) Inventors: Ye Wang, Tianjin (CN); Lufeng Gao, Tianjin (CN); Lei Liu, Tianjin (CN)

(73) Assignee: NINEBOT (BEIJING) TECH CO., LTD., Beijing (CN)

(*) Notice: Subject to any disclaimer, the term of this patent is extended or adjusted under 35 U.S.C. 154(b) by 0 days.

(21) Appl. No.: 15/514,562

(22) PCT Filed: Sep. 24, 2015

(86) PCT No.: PCT/CN2015/090486
§ 371 (c)(1),
(2) Date: Mar. 27, 2017

(87) PCT Pub. No.: WO2016/050162
PCT Pub. Date: Apr. 7, 2016

(65) Prior Publication Data
US 2017/0225737 A1    Aug. 10, 2017

(30) Foreign Application Priority Data
Sep. 29, 2014  (CN) .......................... 2014 1 0515643

(51) Int. Cl.
*B62K 11/10* (2006.01)
*B62K 11/02* (2006.01)
(Continued)

(52) U.S. Cl.
CPC .............. *B62K 11/10* (2013.01); *B60L 11/18* (2013.01); *B60L 11/1877* (2013.01);
(Continued)

(58) Field of Classification Search
CPC ...... B62K 11/10; B62K 11/007; B62K 21/16; B62K 1/00; B62J 25/00
See application file for complete search history.

(56) References Cited

U.S. PATENT DOCUMENTS 4,324,413 A * 4/1982 Bensette .................. B62K 1/00
                                                180/21
6,302,230 B1   10/2001 Kamen
(Continued)

FOREIGN PATENT DOCUMENTS

CN         1270119 A        10/2000
CN         1561296 A         1/2005
(Continued)

OTHER PUBLICATIONS

International Search Report in international application No. PCT/CN2015/090486, dated Dec. 30, 2015, 2 pgs.
(Continued)

*Primary Examiner* — Drew J Brown
(74) *Attorney, Agent, or Firm* — Cooper Legal Group, LLC (57) ABSTRACT

Disclosed is a single-wheeled balance vehicle. The single-wheeled balance vehicle includes: a wheel provided on a wheel frame, a motor transmission mechanism fixed in the wheel frame and arranged to drive the vehicle according to acquired manned mode information; a wheel cover arranged to partially cover the wheel; a skeleton arranged to reinforce mechanical strength of the wheel cover; and footboards arranged to be stepped on by both feet of a driver in driving. The wheel cover partially covers the wheel and in embodiments may be in a surface contact, so that the contact area is larger, contact stress is more dispersive, a strain is relatively small, the deformation of the wheel cover can be reduced, the possibility that a tire or a hub motor is rubbed (Continued)

or locked due to deformation of the wheel cover in the related art can be avoided, and safety performance can be improved.

9 Claims, 7 Drawing Sheets

(51) Int. Cl.
*B62K 11/00* (2006.01)
*B62J 25/00* (2006.01)
*B62K 1/00* (2006.01)
*B62K 21/16* (2006.01)
*B60L 11/18* (2006.01)

(52) U.S. Cl.
CPC ................ *B62J 25/00* (2013.01); *B62K 1/00* (2013.01); *B62K 11/007* (2016.11); *B62K 11/02* (2013.01); *B62K 21/16* (2013.01); *B60L 2200/16* (2013.01)

(56) References Cited

U.S. PATENT DOCUMENTS

| | | | |
|---|---|---|---|
| 7,445,067 B2 | 11/2008 | Marsh | |
| 8,403,083 B2* | 3/2013 | Waita | B62K 11/007 180/21 |
| 8,459,667 B2 | 6/2013 | Ungar | |
| 8,807,250 B2* | 8/2014 | Chen | B62K 1/00 180/21 |
| 9,481,423 B2* | 11/2016 | Chen | B62K 1/00 |
| 9,796,444 B1* | 10/2017 | Lin | B62K 15/006 |
| 9,950,762 B2* | 4/2018 | Lin | B62K 1/00 |
| 2009/0266629 A1 | 10/2009 | Simeray | |
| 2012/0168235 A1 | 7/2012 | Gomi | |
| 2013/0133959 A1* | 5/2013 | Kamiyama | B62D 15/00 180/6.2 |
| 2014/0058600 A1 | 2/2014 | Hoffmann et al. | |
| 2015/0259020 A1 | 9/2015 | Hoffmann et al. | |
| 2017/0334501 A1* | 11/2017 | Lin | B62K 11/007 |

FOREIGN PATENT DOCUMENTS

| | | |
|---|---|---|
| CN | 101417682 A | 4/2009 |
| CN | 201670094 U | 12/2010 |
| CN | 102275621 A | 12/2011 |
| CN | 103144715 A | 6/2013 |
| CN | 103407528 A | 11/2013 |
| CN | 103407532 A | 11/2013 |
| CN | 103683782 A | 3/2014 |
| CN | 103707972 A | 4/2014 |
| CN | 203511894 U | 4/2014 |
| CN | 103818502 A | 5/2014 |
| CN | 203714079 U | 7/2014 |
| CN | 203740051 U | 7/2014 |
| CN | 203740052 U | 7/2014 |
| CN | 104309746 A | 1/2015 |
| JP | 2011068161 A | 4/2011 |
| JP | 2011068220 A | 4/2011 |
| JP | 2011079426 A | 4/2011 |
| TW | M403480 U | 5/2011 |
| WO | 2011033575 A1 | 3/2011 |
| WO | 2014031904 A2 | 2/2014 |

OTHER PUBLICATIONS

English Translation of the Written Opinion of the International Search Authority in international application No. PCT/CN2015/090486, dated Dec. 30, 2015, 6 pgs.

Supplementary European Search Report in European application No. 15847090.6, dated Oct. 5, 2017, 7 pgs.

* cited by examiner

SINGLE-WHEELED BALANCE VEHICLE

TECHNICAL FIELD

The disclosure relates to the technical field of dynamic balance vehicles, and more particularly, to a single-wheeled balance vehicle.

BACKGROUND

Scooters may include man-driven and power-driven scooters. Most of the man-driven scooters and power-driven balance vehicles require drivers to have good driving skills to keep a balance in all directions such as front, behind, left or right. However, since the power-driven scooters usually adopt a self-balancing system including a gyroscope, an acceleration sensor and the like for keeping a balance of a vehicle body, the power-driven scooters do not have so high requirement for the driving skills of drivers as the man-driven scooters.

At present, the scooters on the market include two-wheeled scooters and monocycles. Since a single-wheeled balance vehicle has only one wheel and includes operations for keeping a balance of a body, it has a relatively high requirement. The key distinction between the man-driven monocycle and the power-driven monocycle includes that the sources of power are different and the latter is equipped with a self-balancing system, as well as including other differences derived therefrom. Therefore, the power-driven single-wheeled balance vehicle is mainly introduced in the related art as follows.

The Chinese patent application No. CN 99103781 titled as "one-wheel motor and spherical vehicle" proposes a spherical monocycle. Since the whole weight of the monocycle is almost supported by the only one wheel when the monocycle is driving on the road. The entire monocycle drives by the only one wheel on the ground. When the monocycle turns, a pair of torsional moments at a certain level directly (through a simple mechanism) provided to a whole vehicle body by rotating a steering wheel (or the direction joystick) by a driver (it takes naturally a landing point of one wheel as a rotation center) to twist the entire monocycle rotate one driving direction. Thus, during a driving process, the monocycle cannot automatically maintain a front-rear balance so that it has a high requirement for the driving skills of drivers.

The Chinese Taiwanese patent application No. TWM403480 titled as "electric monocycle" proposes an electric monocycle with footboards and auxiliary wheels. A drive-by-wire operated handle is used to control forward and backward, and a balance of left or right side is kept by the auxiliary wheels. Drivers must grip a vehicle body and twist both legs or both feet reversely so as to turn when the electric monocycle is turning and in a driving maneuvering action. Due to existence of the auxiliary wheels, both legs or both feet should be twisted with a greater force to drive to swerve, and the leg will exert a larger force on a side plate in swerves.

The U.S. Pat. No. 8,459,667 B2 titled as "foot propelled hobby and/or sport device without handle bar" proposes a monocycle including a rear-side stabilizing guide wheel, a side plate, a supporting surface for a knee or leg so that a driver can drive when standing. Since the side plate and the supporting surface for a knee or leg are provided, each leg of the driver and the monocycle form a 2-point connection in a vertical direction, so that a left-right balance of the monocycle can be controlled in the form of walking on stilts easily and a driving difficulty of a standing monocycle is reduced.

The Chinese patent application No. CN 02807642 titled as "vehicle and method of using gravity and mass transfer control system", the U.S. Pat. No. 6,302,230 titled as "personal mobility vehicles and methods", and the U.S. patent application No. 2009/0266629 titled as "motorized transport vehicle for a pedestrian", propose a method and device for driving an actuator by a specific algorithm by detecting a change in a center of gravity of a person/vehicle system to achieve a dynamic balance so that a dynamically front-rear balancing vehicle becomes possible.

The Chinese patent application No. CN 200810179658 titled as "front-rear self-balanced electric monocycle" proposes an electric monocycle including seats, handrails, and an electronic control system, which can control the monocycle to keep a front-rear balance automatically. The electric monocycle is driven when a driver sits down, uses a manner of a traditional single-wheeled bike for keeping the left-right balance, and provides an automatic balance function in front and rear directions so that it is easy to drive.

The Chinese patent application No. CN 201110089122 titled as "electric single-wheeled bicycle" proposes an electric one-wheeled bicycle including a leg contact plate and foldable footboards, which has a self-balancing function in front and rear directions. As in the U.S. Pat. No. 8,459,667 B2, it proposes to use a leg contact device and the footboards to form two-point support to a driver so that the driver can stand and drive with legs and feet to control a bicycle to keep a balance at left and right side and turn.

In summary, a wheel cover (vehicle housing) of the abovementioned monocycle also has a left and right two-piece structure. A distance between the wheel cover and the tire/hub is limited. Under the lateral force applied by legs, or when a road surface is uneven, the wheel cover deforms and fails very easily, rubbing or blocking tires. Especially for the monocycle having the front and rear self-balancing function, a speed of a motor is directly related to a front-rear pitch gesture of a monocycle body. Once the tire is rubbed or blocked by the wheel cover, it is easy to cause the motor to have a high speed or be blocked, so that the driver loses his balance and falls, which has a security problem; once the wheel cover is worn or damaged, because of its large size, complex structure and high cost, it is inconvenient in replacement and high in maintenance costs.

For two-wheeled vehicles, due to uneven road or other possible reasons, it is easy to lead to problems similar to the abovementioned monocycle, which will not be described in detail.

SUMMARY

In view of the abovementioned problems, an embodiment of the disclosure provides a single-wheeled balance vehicle which overcomes the abovementioned problems or at least partially solves the abovementioned problems.

According to an aspect of the disclosure, a single-wheeled balance vehicle is provided, which at least includes: a wheel which is provided on a wheel frame, a motor transmission mechanism which is fixed in the wheel frame and is arranged to drive the vehicle according to acquired manned mode information; a wheel cover which is arranged to partially cover the wheel; a skeleton which is arranged to reinforce mechanical strength of the wheel cover so as to improve a load-carrying property of the wheel cover in a driving process of the single-wheeled balance vehicle; and footboards which are arranged to be stepped on by both feet of a driver in the driving process and generate the manned mode information.

Preferably, in an embodiment of the present application, the wheel frame may include an axle and two axle brackets, the wheel may be provided on the axle, and the two axle brackets may be respectively fixed at left and right sides of the axle, the wheel covers may be fixed on the axle brackets or the axle to partially cover left and right sides of the wheel, and the footboards may be connected to the axle to drive the wheel to rotate by operating and controlling the footboards.

Preferably, in an embodiment of the present application, the wheel frame may further include an axle and an axle bracket, a motor assembly mechanism may be fixed on the axle to drive the wheel to rotate, the axle bracket may be fixed at left and right sides of the axle, and the wheel cover may be fixed on the axle bracket or the axle to partially cover left and right sides of the wheel.

Preferably, in an embodiment of the present application, the wheel frame or the wheel cover may be provided with a rotation shaft, the footboards may be provided on the rotation shaft, and the footboards may be rotatable about the rotation shaft to be accommodated.

Preferably, in an embodiment of the present application, the skeleton may be a skeleton in a frame structure.

Preferably, in an embodiment of the present application, the skeleton in a frame structure may include beams and a vertical reinforcement provided between the beams.

Preferably, in an embodiment of the present application, the skeleton in a frame structure may further include stiffeners provided on the beams.

Preferably, in an embodiment of the present application, a handle base may be provided on the skeleton in a frame structure, a rotation shaft may be provided on the handle base, and a resettable handle may be provided on the rotation shaft.

Preferably, in an embodiment of the present application, the single-wheeled balance vehicle may further include a housing fixed on the wheel cover or the wheel frame to withstand collision or friction in place of the wheel cover.

Preferably, in an embodiment of the present application, the single-wheeled balance vehicle may further include a folding handle provided on the skeleton.

Compared with the existing solution, in an embodiment of the present application, since a skeleton is provided at an abutment of the two wheel covers, the two wheel covers may be in a surface contact, so that a contact area is larger, contact stress is more dispersive, a strain is relatively small, and therefore there is higher rigidity and higher relative strength; when the vehicle travels through an uneven road, or when legs or knees of a driver exert a larger load on the vehicle housing, or when the vehicle hits the ground or other objects, since the wheel covers may be in surface contact, the contact area is larger, the contact stress is more dispersive, the strain is relatively small, the deformation of the wheel covers can be obviously reduced, the possibility that a tire or a hub motor is rubbed or locked due to large deformation of the wheel cover in the related art can be avoided, and safety performance can be improved.

The foregoing description is merely an overview of a technical solution of the disclosure and can be implemented in accordance with the teachings of the disclosure in order to enable a clearer understanding of the technical means of the disclosure. Moreover, in order to make the abovementioned and other objects, features and advantages of the disclosure more obvious, specific embodiments of the disclosure will be described hereinafter.

BRIEF DESCRIPTION OF THE DRAWINGS

Various other advantages and benefits will become apparent to those skilled in the art upon reading the following detailed description of preferred embodiments. The drawings of the present embodiment are merely for the purpose of illustrating the preferred embodiments and are not to be construed as limiting the disclosure. Moreover, throughout the drawings, the same reference numerals are used to designate like components. In the drawings.

DETAILED DESCRIPTION

Exemplary embodiments of the present disclosure will be described in more detail below with reference to the accompanying drawings. While the exemplary embodiments of the present disclosure are shown in the drawings, it should be understood that the present disclosure may be embodied in various forms and should not be limited to the embodiments set forth herein. Rather, these embodiments are provided to enable a more thorough understanding of the present disclosure and to completely convey the scope of the disclosure to those skilled in the art.

One of main ideas of the present application is as follows.

One of the main ideas of the single-wheeled balance vehicle provided in the embodiments of the present disclosure at least includes: a wheel which is provided on a wheel frame, a motor transmission mechanism which is fixed in the wheel frame and is arranged to drive the vehicle according to acquired manned mode information; a wheel cover which is arranged to partially cover the wheel; a skeleton which is arranged to reinforce mechanical strength of the wheel cover so as to improve a load-carrying property of the wheel cover in a driving process of the single-wheeled balance vehicle; and footboards which are arranged to be stepped on by both feet of a driver in the driving process.

When the abovementioned core idea of the present application is applied to a two-wheeled vehicle, which at least includes: a steering lever arranged to control a traveling direction of the vehicle and provided on the wheel frame; two wheels provided on the wheel frame; a wheel cover arranged to partially cover the wheel and fixed on the wheel frame; a skeleton arranged to reinforce mechanical strength of the wheel cover and provided on the wheel frame so as to improve a load-carrying property of the wheel cover in a driving process of the vehicle; and footboards arranged to be stepped on by both feet of a driver in the driving process, wherein the footboards are provided on the wheel frame or the wheel cover, and the footboards are located between the two wheels.

The abovementioned core idea of the present application may be applied to a vehicle with a hub or to a vehicle without a hub. In order to clearly explain the abovementioned core idea of the present application, the following embodiments of the present application omit a hub, an outer rotor, a balance control system and other structural components which do not directly affect the arrangement of skeleton.

The abovementioned main idea of the present application will be described below with reference to a single-wheeled balance vehicle in a power-driven manner. For those skilled in the art, the abovementioned main idea of the present application may be applied to a single-wheeled balance vehicle in a man-driven manner, a two-wheeled balance vehicle, etc., without the need for creative work, which will not be described in detail.

Figure 1:
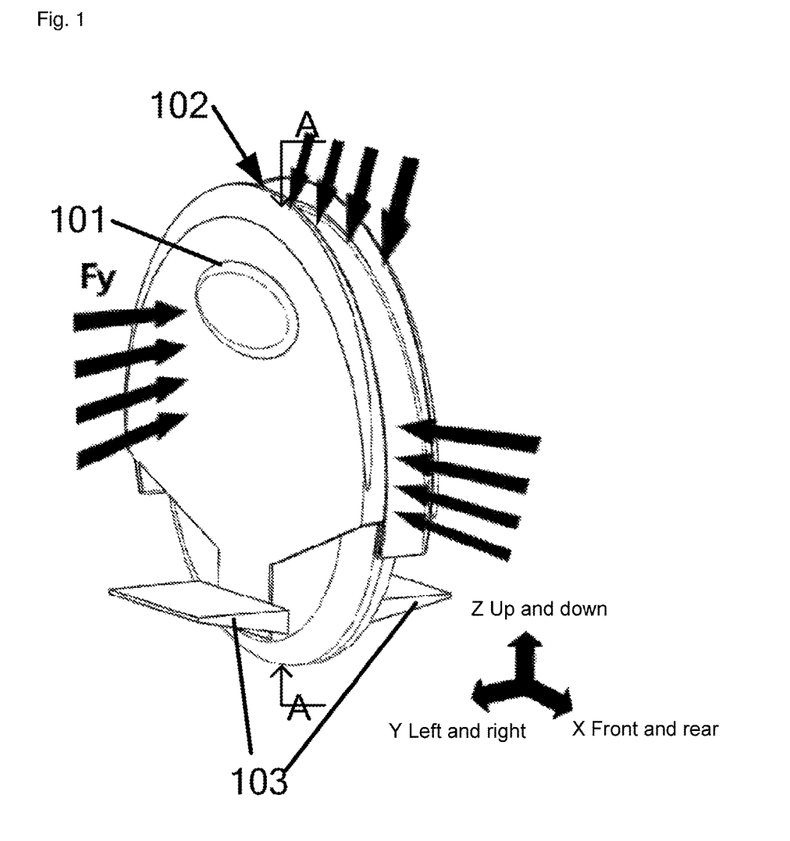
FIG. 1 is an external schematic diagram of a single-wheeled balance vehicle according to an embodiment of the present application.
Figure 2:
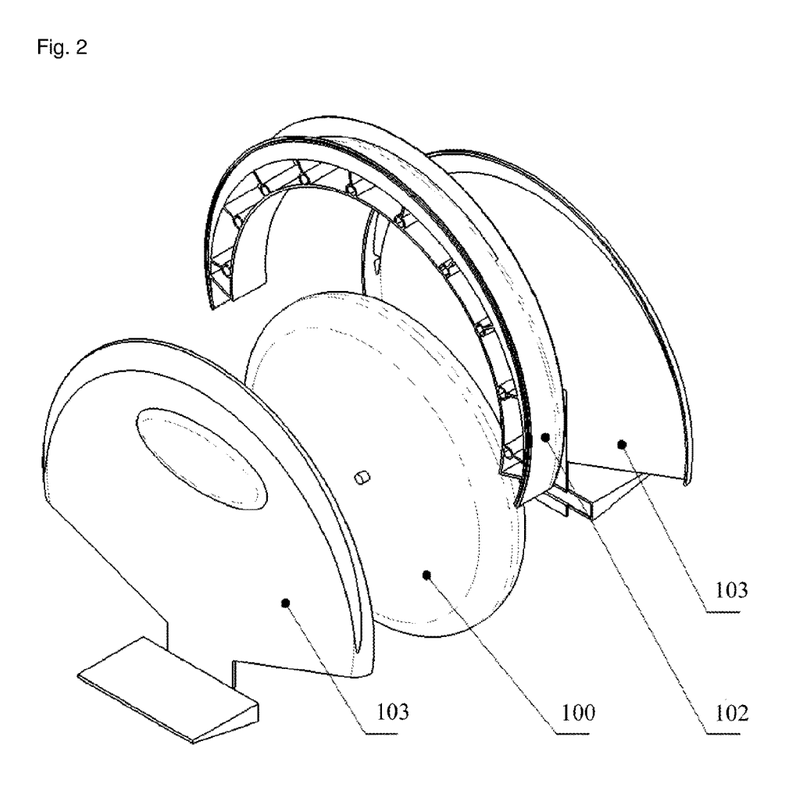
FIG. 2 is a schematic diagram of an explosion structure of a single-wheeled balance vehicle according to an embodiment of the present application.

FIG. 1 is an external schematic diagram of a single-wheeled balance vehicle according to an embodiment of the present application; FIG. 2 is a schematic diagram of an explosion structure of a single-wheeled balance vehicle according to an embodiment of the present application. As shown in FIG. 1 and FIG. 2, a skeleton 102 is fixed at an abutment of left and right wheel covers 101 so as to improve a load-carrying property of the wheel covers 101, thereby increasing mechanical strength of the wheel cover. After being assembled, the left and right wheel covers 101 and the skeleton 102 may be equivalent to an inner shell. The left and right wheel covers 101 and the skeleton 102 may be integrally formed or may be formed separately. If formed separately, the skeleton 102 and the left and right wheel covers 101 may be fixed together by, for example, screws.

In the present embodiment, footboards 103 stepped on by both feet of a driver are provided on the wheel covers 101. In the present embodiment, the footboards 103 may be located at a position below an axis of the wheel. It should be noted that, in other embodiments, the footboards 103 may also be located above the axis of the wheel, such as being integrally provided above the wheel directly or in a position level with the axis of the wheel, which will not be described in detail. However, there is no need for creative work for those skilled in the art, and it is known that the footboards 103 are not limited to being provided on the wheel covers 101 and may be provided on the wheel frame by using a usual method in the industry, which will not be described in detail.

As shown in FIG. 1, the vehicle carries loads Fx, Fy, Fz in a three-dimensional coordinate system XYZ during a driving process, an X direction is a front-rear direction when the vehicle is traveling, a Y direction is a left-right direction, and a Z direction is a up-down direction. Fx, Fy, Fz represent impact loads generated by an impact in three directions or loads applied to the wheel cover/housing when the driver is driving, respectively.

Figure 3:
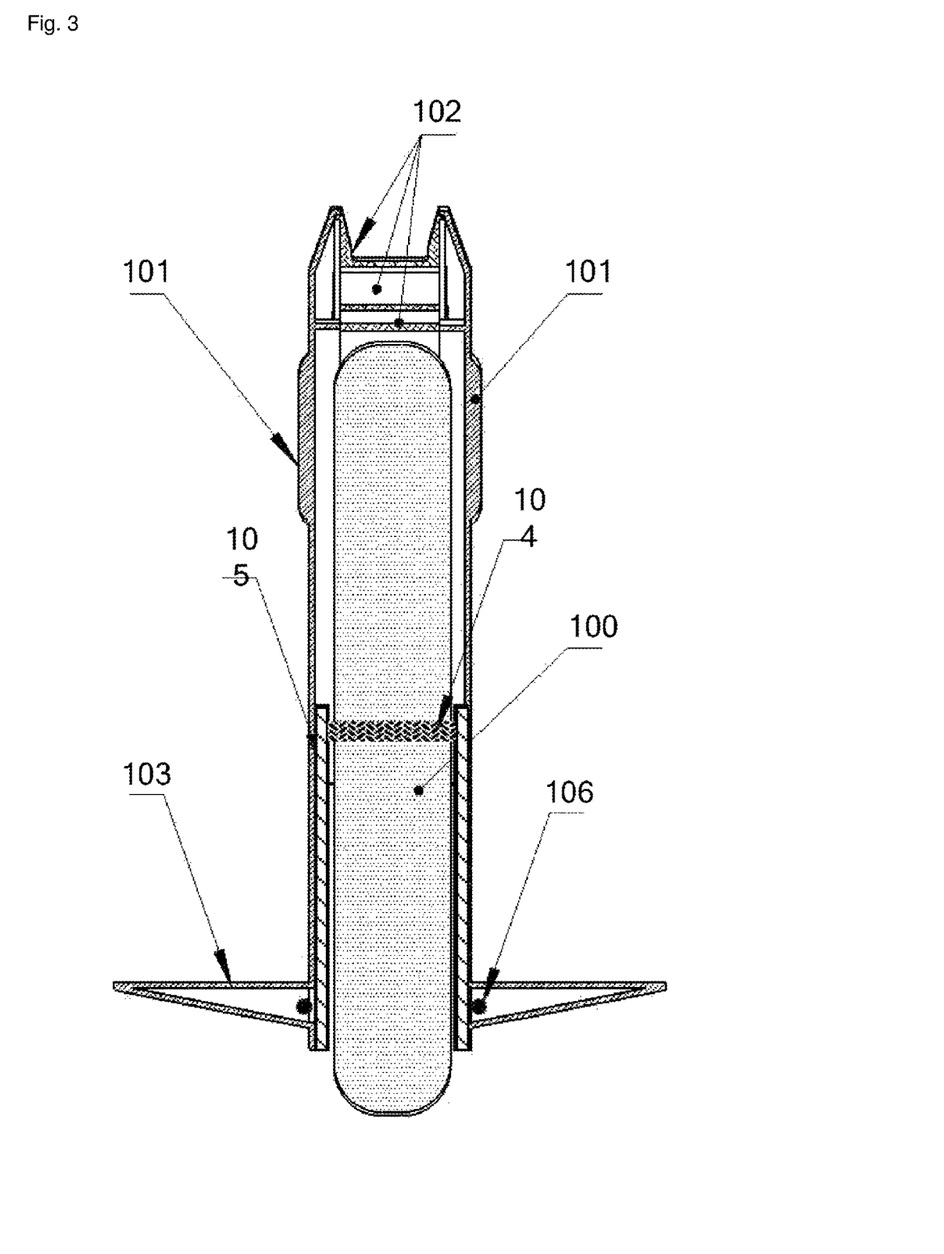
FIG. 3 is a cross-sectional diagram of the single-wheeled balance vehicle in FIG. 1.

FIG. 3 is a cross-sectional diagram of the single-wheeled balance vehicle in FIG. 1; as shown in FIG. 3, in the cross-sectional diagram along an A-A direction as shown in FIG. 1, namely, along a vertical direction passing the axis of the wheel, the wheel frame includes an axle 104 and an axle bracket 105. A wheel (not shown in the figure) and a motor assembly mechanism 100 are fixed on the axle 104 to drive the wheel to rotate. The axle bracket 105 is fixed at left and right sides of the axle 104. The wheel covers 101 are fixed on the axle bracket 105 or the axle 104 by screws or the like to partially cover left and right sides of the wheel.

For the single-wheeled balance vehicle in a man-driven manner, the skeleton may be provided with reference to FIG. 3. Specifically, the wheel is provided on the axle, and two axle brackets are respectively fixed at left and right sides of the axle, the wheel covers are fixed on the axle brackets or the axle to partially cover left and right sides of the wheel, and the footboards are connected to the axle to drive the wheel to rotate by operating and controlling the footboards, which will not be described in detail in the drawings.

In the present embodiment, the axle bracket 105 of the wheel frame or the wheel covers 101 may be provided with a rotation shaft 106, the footboards 103 are provided on the rotation shaft 106, and the footboards 103 are rotatable about the rotation shaft 106 to be accommodated.

Figure 4:
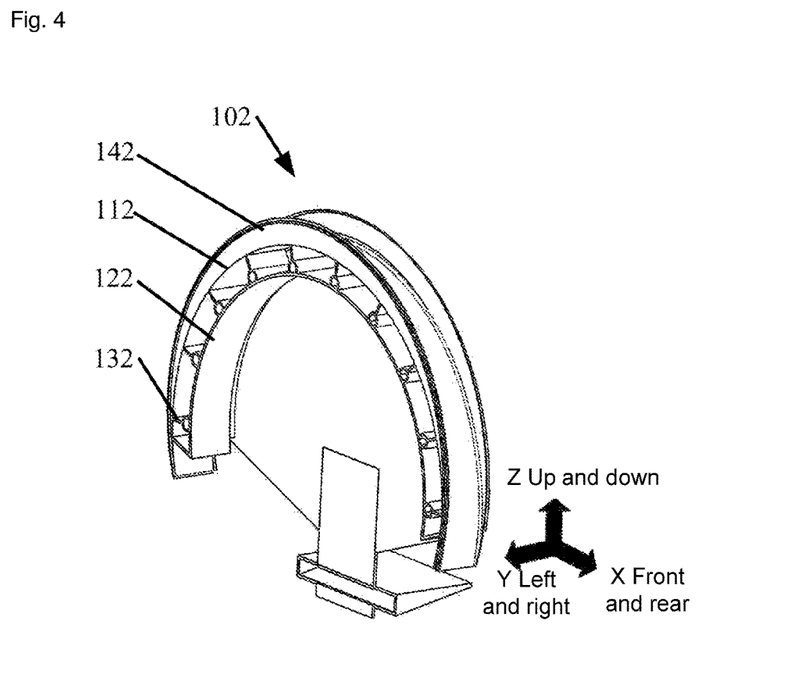
FIG. 4 is a structural schematic diagram of a skeleton according to an embodiment of the present application.

FIG. 4 is a structural schematic diagram of a skeleton according to an embodiment of the present application; as shown in FIG. 4, the skeleton 102 in a frame structure includes an upper beam 112, a lower beam 122, and a vertical reinforcement 132 provided between the upper beam 112 and the lower beam 122. In the present embodiment, the skeleton 102 may further include stiffeners 142. The stiffeners 142 are provided on the upper beam 112, respectively; so that a groove may be formed. The groove may hide a subsequent handle. The stiffeners 142 cause a cross-section to be close to an end surface of an I-beam. Compared with the solution of related art, a load-carrying property in the vertical direction Z and its anti-torsion rigidity can be improved.

In the present embodiment, the skeleton in a frame structure may be, but is not limited to, to be manufactured by casting using engineering plastics, lightweight metals, and other material.

In another embodiment, in addition to the vertical reinforcement 132 provided between the upper beam 112 and the lower beam 122 in the vertical direction, a vertical reinforcement 132 in the horizontal direction may also be added. The vertical reinforcement 132 in the vertical direction and the vertical reinforcement 132 in the horizontal direction may be crossed into a cross shape, which will not be described in detail in the drawings.

Figure 5:
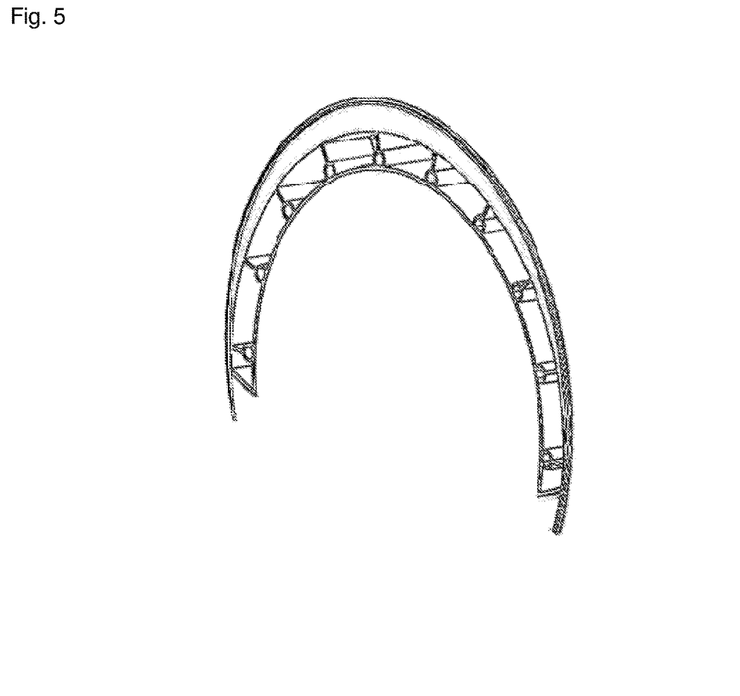
FIG. 5 is a schematic diagram of a contact surface at an abutment of left and right wheel covers according to an embodiment of the present application.
Figure 6:
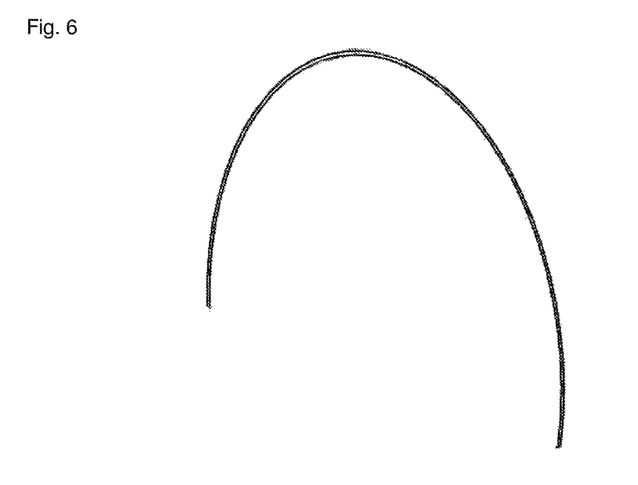
FIG. 6 is a schematic diagram of a contact surface at an abutment of left and right wheel covers in the related art.

FIG. 5 is a schematic diagram of a contact surface at an abutment of left and right wheel covers according to an embodiment of the present application; FIG. 6 is a schematic diagram of a contact surface at an abutment of left and right wheel covers in the related art; as shown in FIG. 5 and FIG. 6, since a skeleton is provided at an abutment of the two wheel covers, the wheel covers may be in a surface contact form, so that a contact area is larger, contact stress is more dispersive, a strain is relatively small, and therefore there is a higher rigidity and a higher relative strength; however, in the related art, the wheel covers are abutted directly, similar to a linear contact, a contact area is very small, contact stress is concentrated and thus a strain is large, and therefore there is a lower rigidity and a smaller relative strength.

Referring again to FIG. 4, the upper beam 112 and the lower beam 122 are in an arcuate shape, and there are several vertical reinforcements 132 in the vertical direction and in the horizontal direction between the two arcs, thereby forming a structure similar to an arch bridge. While the structure is fixedly connected with the two wheel covers, there is an "arch bridge" of a three-dimensionally supporting structure in the connection Therefore, an impact load or a static load of the wheel covers at the left and right sides in X direction, Y direction, and Z direction is mostly passed to the skeleton in a frame structure. Therefore, when the vehicle travels through an uneven road, or when legs or knees of a driver exert a larger load on the vehicle housing, or when the vehicle hits the ground or other objects, since the wheel covers may be in a surface contact, a contact area is larger, contact stress is more dispersive, a strain is relatively small, the deformation of the wheel covers can be obviously reduced, the possibility that a tire or a hub motor is rubbed or locked due to large deformation of the wheel cover in the related art can be avoided, and safety performance can be improved.

Figure 7:
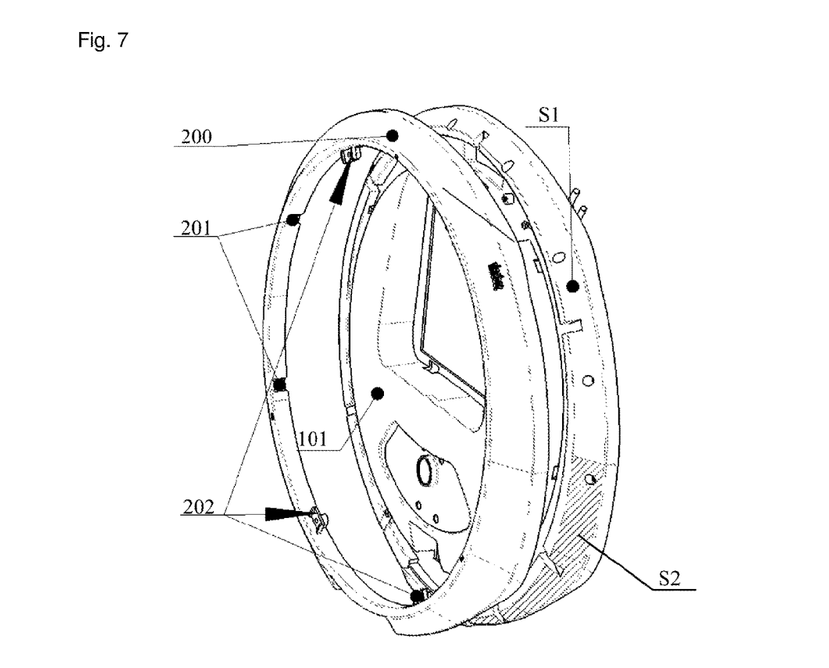
FIG. 7 is a structural diagram of a housing according to an embodiment of the present application.

In order to further reduce the possibility of breakage of the left and right wheel covers, an embodiment of the present application further provides an annular housing 200 which is provided on a periphery of the left and right wheel covers, which may be fixed on the wheel covers or the wheel frame. FIG. 7 is a structural diagram of a housing according to an embodiment of the present application; as shown in FIG. 7, the housing may be fixed to the wheel covers 101 by means of several buckles 201 and/or a small number of screw bits 202 in order to portably replace the housing, which may be replaced by users without tools or with only a screwdriver to disassemble a small number of screws; an inner surface of the annular housing is in close contact with an outer surface S1 of the wheel covers 101 and a partial surface S2 of a diagonal shadow mark, completely or substantially enveloping the wheel covers 101.

In the present embodiment, since the housing 200 completely or substantially envelops the wheel covers 101, the housing 200 may be impacted first in place of the wheel covers 101 in case of a collision. Since the annular housing 200 is in close contact with the wheel covers 103, it is possible to play a role of absorbing collision energy and reduce a probability of deformation/rupture of the wheel covers 101. In addition, when the housing 200 is scratched or damaged due to the impact, it is easy to replace since the housing is fixed to the wheel covers 101 by means of several buckles 201 and/or a small number of screw bits 202, and a maintenance cost and maintenance difficulty can be reduced for users.

It should be noted that, in other embodiments, the single-wheeled balance vehicle may not include the housing as shown in FIG. 7.

Figure 8:
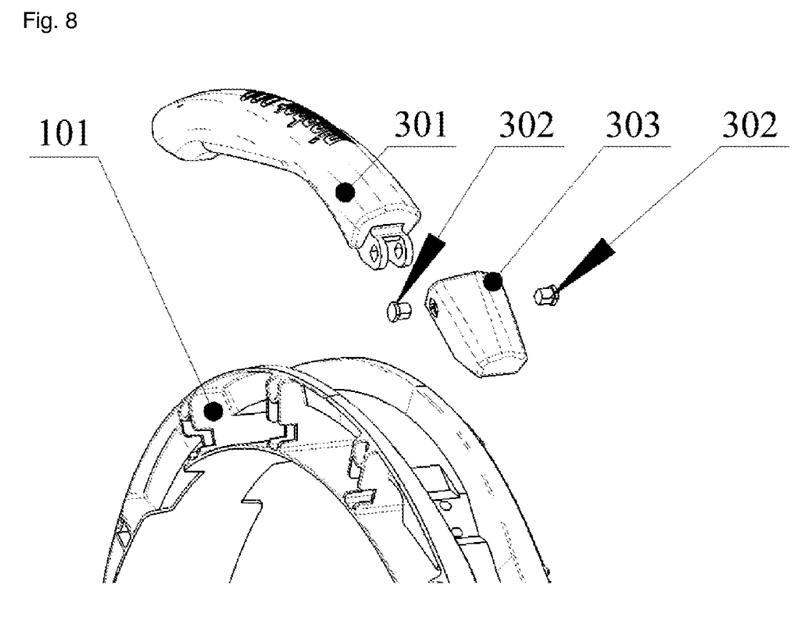
FIG. 8 is a diagram of an explosion structure of a folding handle according to an embodiment of the present application.

In order to facilitate the transportation of the single-wheeled balance vehicle, an embodiment of the present application provides a folding handle. FIG. 8 is a diagram of an explosion structure of a folding handle according to an embodiment of the present application; as shown in FIG. 8, the handle 301 is fixed to a handle base 303 by means of a rotation shaft 302, and the handle base 303 is fixed to the skeleton in a frame structure 102 by means of screws or pins. The handle 301 and the handle base 303 may be relatively rotated, and, in addition, may be designed by providing a limiting device or by means of a structural limit design to limit their relative rotational angle. The rotation shaft 302 may have some damping, or may achieve segmented damping by a similar mechanism such as a ratchet.

In this embodiment, the handle 301 may include a handle skeleton (not shown in the figure) and a soft coating material (not shown in the figure) coated on a periphery of the handle skeleton. The handle skeleton can be made of high-strength plastic or metal, which can not only ensure strength of the handle, but also provide a comfortable feel.

In this embodiment, when the handle 301 is lifted by hands, the handle 301 can rotate upward about the rotation shaft 302, and the handle 301 is held in an original position after being released; when the handle 301 is pressed by hands, the handle may simply fall into a folding position in a groove of the skeleton in a frame structure, which can ensure an aesthetically pleasing appearance.

In this embodiment, since the skeleton in a frame structure 102 has higher strength and rigidity and the handle base 303 is fixed to the skeleton in a frame structure 102, the handle 301 can form a single support by means of the handle base 303, which has a high carrying capacity.

It should be noted that, in other embodiments, a single-wheeled balance vehicle may not include the folding handle described in FIG. 8.

Figure 9:
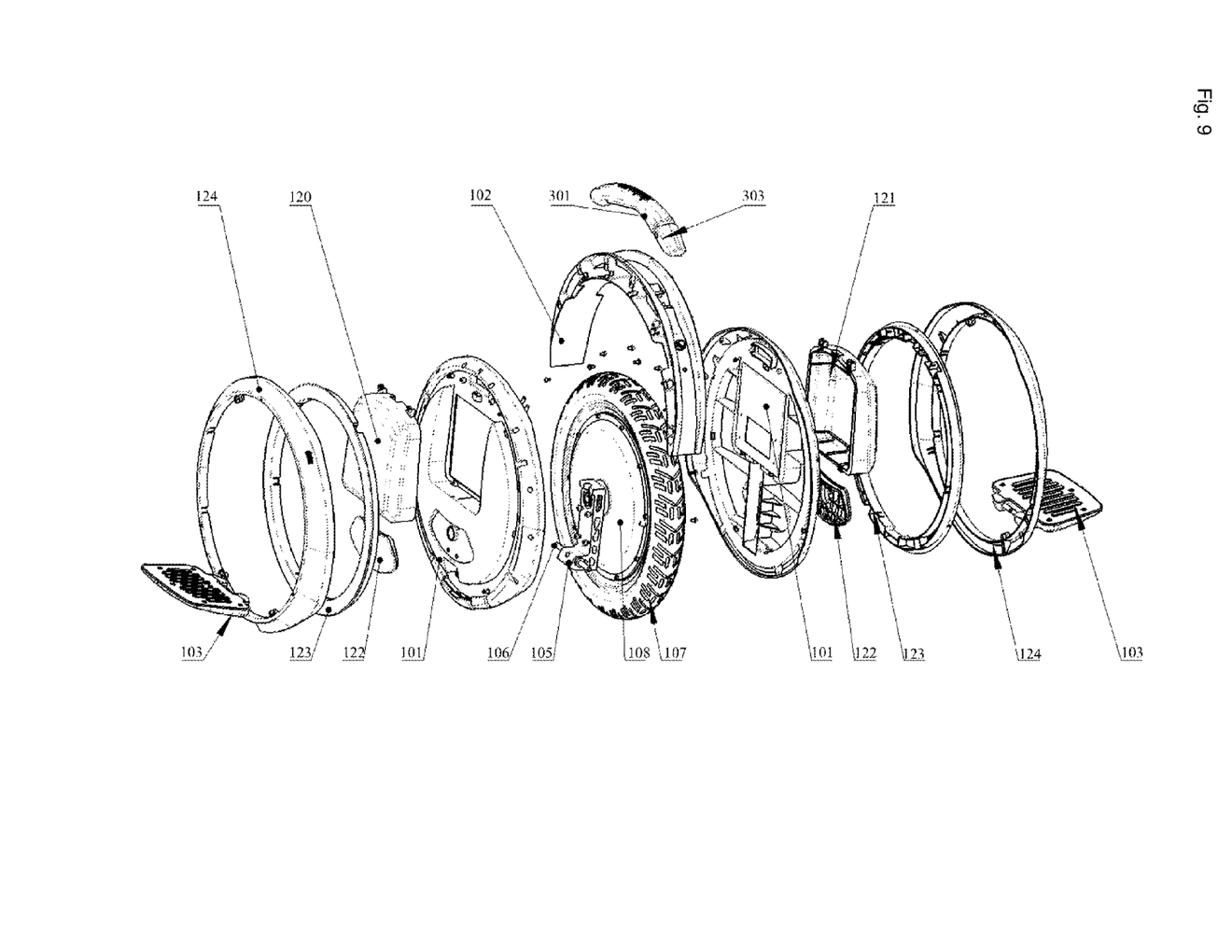
FIG. 9 is an exploded diagram of a specific single-wheeled balance vehicle according to an embodiment of the present application.

The abovementioned core idea of the present application is applied to a specific single-wheeled balance vehicle, and the structure of the single-wheeled balance vehicle is shown in more detail in the present embodiment. FIG. 9 is an exploded diagram of a specific single-wheeled balance vehicle according to an embodiment of the present application; as shown in FIG. 9, a tire 107 is fixed to a hub motor 108, the axle bracket 105 is fixed to a shaft of the hub motor 108, the folding handle 303 is mounted on the handle base 110 by the rotating shaft (not shown in the figure), and the handle base 110 is fixed to the skeleton in a frame structure 102; the wheel covers 101 are fixed to the skeleton in a frame structure 102, an equipment compartment case 120 and a battery compartment 121 are fixed to the left and right wheel covers 101, respectively; two ankle pads 122 are fixed to the left and right wheel covers 101, respectively; two annular lamp assemblies 123 and a snap-fit anti-collision housing 124 are fixed to the left and right wheel covers 101, respectively; and two folding footboards 103 are fixed to the axle bracket 105 by the rotation shaft 106, respectively.

In the abovementioned embodiment, a motor transmission mechanism (not shown in the figure) is fixed in the wheel frame, and the motor transmission mechanism is arranged to drive the vehicle according to acquired manned mode information, for example, a transmission scheme described in U.S. Pat. No. 7,445,067 titled as "electric wheel motor assembly", the patent No. CN201020207416.8 titled as "hub motor drive structure of self-balanced vehicle", and the patent application No. 201410006411.1 titled as "shaftless hub motor".

The foregoing description shows and describes several preferred embodiments of the disclosure, but as previously stated, it is to be understood that the disclosure is not limited to the forms disclosed herein and should not be construed as an exclusion of other embodiments, but may be used in a variety of other combinations, modifications and environments, and may be modified within the scope of the disclosure as described herein by means of the above teachings or techniques or knowledge in the related field. The modifications and changes made by those skilled in the art should be within the scope of the appended claims of the disclosure without departing from the spirit and scope of the disclosure.

What is claimed is:

1. A single-wheeled balance vehicle, comprising: a wheel which is provided on a wheel frame, a motor transmission mechanism which is fixed in the wheel frame and is arranged to drive the single-wheeled balance vehicle according to acquired manned mode information; left and right wheel covers which are arranged to partially cover the wheel; a skeleton in a frame structure which is arranged to reinforce mechanical strength of the left and right wheel covers, wherein the skeleton in a frame structure is provided at an abutment of the left and right wheel covers, the left and right wheel covers being in a surface contact form, so that contact stress is dispersive, a strain is small, and therefore deformation of the left and right wheel covers is reduced, and a load-carrying property of the left and right wheel covers is improved in a driving process of the single-wheeled balance vehicle; and footboards which are arranged to be stepped on by both feet of a driver in the driving process and generate the manned mode information.

2. The single-wheeled balance vehicle according to claim 1, wherein the wheel frame comprises an axle and two axle brackets, wherein the wheel is provided on the axle, and the two axle brackets are respectively fixed at left and right sides of the axle, the left and right wheel covers are fixed on the two axle brackets or the axle so as to partially cover left and right sides of the wheel, and the footboards are connected to the axle so as to drive the wheel to rotate by operating and controlling the footboards.

3. The single-wheeled balance vehicle according to claim 1, wherein the wheel frame further comprises an axle and an axle bracket, wherein the motor transmission mechanism is fixed on the axle to drive the wheel to rotate, the axle bracket is fixed at left and right sides of the axle, and the left and right wheel covers are fixed on the axle bracket or the axle so as to partially cover left and right sides of the wheel.

4. The single-wheeled balance vehicle according to claim 1, wherein the wheel frame or the left and right wheel covers are provided with a rotation shaft, wherein the footboards are provided on the rotation shaft, and the footboards are rotatable about the rotation shaft to be accommodated.

5. The single-wheeled balance vehicle according to claim 1, wherein the skeleton in a frame structure comprises beams and a vertical reinforcement provided between the beams.

6. The single-wheeled balance vehicle according to claim 5, wherein the skeleton in a frame structure further comprises stiffeners which are provided on the beams.

7. The single-wheeled balance vehicle according to claim 1, wherein a handle base is provided on the skeleton in a frame structure, another rotation shaft is provided on the handle base, and a resettable handle is provided on the another rotation shaft.

8. The single-wheeled balance vehicle according to claim 1, further comprising a housing which is fixed on the left and right wheel covers or the wheel frame so as to withstand collision or friction in place of the left and right wheel covers.

9. The single-wheeled balance vehicle according to claim 1, further comprising a folding handle which is provided on the skeleton in a frame structure.

* * * * *

UNITED STATES PATENT AND TRADEMARK OFFICE
CERTIFICATE OF CORRECTION

PATENT NO. : 10,160,508 B2  
APPLICATION NO. : 15/514562  
DATED : December 25, 2018  
INVENTOR(S) : Wang et al.

Page 1 of 1

It is certified that error appears in the above-identified patent and that said Letters Patent is hereby corrected as shown below:

On the Title Page

Item [73], delete "NINEBOT (BEIJING) TECH CO., LTD., Beijing (CN)" and insert therefor --NINEBOT (TIANJIN) TECH CO., LTD., Tianjin (CN)--

Signed and Sealed this  
Twelfth Day of November, 2019

Andrei Iancu  
*Director of the United States Patent and Trademark Office*